US010378690B2

(12) United States Patent
Carnevali

(10) Patent No.: US 10,378,690 B2
(45) Date of Patent: Aug. 13, 2019

(54) SYSTEMS AND METHODS FOR MAKING AND USING MOUNTS FOR RECEIVING OBJECTS AND COUPLING TO SURFACES

(71) Applicant: National Products, Inc., Seattle, WA (US)

(72) Inventor: Jeffrey D. Carnevali, Seattle, WA (US)

(73) Assignee: NATIONAL PRODUCTS, INC., Seattle, WA (US)

( * ) Notice: Subject to any disclaimer, the term of this patent is extended or adjusted under 35 U.S.C. 154(b) by 0 days.

(21) Appl. No.: 15/650,732

(22) Filed: Jul. 14, 2017

(65) Prior Publication Data

US 2019/0017651 A1 Jan. 17, 2019

(51) Int. Cl.

*F16M 11/14* (2006.01)
*F16M 11/20* (2006.01)
*F16M 11/42* (2006.01)
*A47B 95/00* (2006.01)
*F16M 13/02* (2006.01)

(52) U.S. Cl.

CPC ....... *F16M 11/2078* (2013.01); *A47B 95/008* (2013.01); *F16M 11/14* (2013.01); *F16M 11/2064* (2013.01); *F16M 11/2085* (2013.01); *F16M 11/425* (2013.01); *F16M 13/02* (2013.01); *F16M 2200/022* (2013.01); *F16M 2200/024* (2013.01); *F16M 2200/045* (2013.01); *F16M 2200/065* (2013.01)

(58) Field of Classification Search

USPC ................ 248/128, 68.1, 67.7, 70, 72, 74.4
See application file for complete search history.

(56) References Cited

U.S. PATENT DOCUMENTS

| | | | | |
|---|---|---|---|---|
| 180,881 | A | 8/1876 | Howson | |
| 538,534 | A | 4/1895 | Neill | |
| 596,729 | A | 1/1898 | White | |
| 842,007 | A * | 1/1907 | Parker | B25B 5/006 269/45 |

(Continued)

OTHER PUBLICATIONS

U.S. Appl. No. 15/612,764, filed Jun. 2, 2017.

(Continued)

*Primary Examiner* — Monica E Millner
(74) *Attorney, Agent, or Firm* — Lowe Graham Jones PLLC; Bruce E. Black

(57) ABSTRACT

A mount for receiving a cylindrical element includes a retention assembly that retains the cylindrical element between the retention assembly and a base. The retention assembly includes arm segments extending from the base and retaining members disposed along at least one of the arm segments. The retaining members are separated from each other by a gap through which the cylindrical element is insertable. At least one of the arm segments or retaining members is resilient so that the gap is widened when that cylindrical element is pushed through the gap. The retaining members retain the cylindrical element between the retaining members and the base until force is applied to pull the cylindrical element back through the gap. A biasing member extends from, and is moveable relative to, the base to bias the cylindrical element against the retaining members while lacking sufficient force to push the cylindrical element through the gap.

20 Claims, 12 Drawing Sheets

(56) References Cited

U.S. PATENT DOCUMENTS 855,149 A 5/1907 Vaughn et al.
890,656 A 6/1908 Johnson
892,105 A 6/1908 White
958,052 A 5/1910 Williams
1,009,913 A 11/1911 Maguire et al.
1,280,013 A 9/1918 Goddard
1,359,645 A 11/1920 Zink
1,455,441 A 5/1923 Hodny
1,509,068 A 9/1924 Herron
1,934,223 A 11/1933 Booth
2,029,089 A 1/1936 Weirauch
2,114,767 A 4/1938 Hodny et al.
2,121,317 A 6/1938 Cohen
D142,057 S 8/1945 Baxter
2,560,556 A 7/1951 Creedon
2,650,788 A 9/1953 Hulstein
2,688,504 A 9/1954 Parker
2,710,609 A 6/1955 Giller
2,723,823 A 11/1955 Polk
2,752,173 A 6/1956 Krooss
2,859,710 A 11/1958 Elsner
2,861,501 A 11/1958 Strelakos
3,096,061 A 7/1963 Bertell
3,252,677 A * 5/1966 Raymond .............. F16B 5/123 248/68.1
3,304,038 A * 2/1967 Guthrie ..................... B05B 1/20 248/71
3,605,637 A 9/1971 Prete, Jr.
3,652,050 A 3/1972 Marrujo et al.
3,779,502 A 12/1973 Marberg
3,843,272 A 10/1974 Jorn
4,060,241 A 11/1977 Hegel
4,060,331 A 11/1977 Domer et al.
4,066,231 A 1/1978 Bahner
4,066,311 A 1/1978 Poulson
D247,420 S 3/1978 Reynolds
4,085,684 A 4/1978 McLennan et al.
4,183,387 A 1/1980 Lenz
4,205,486 A 6/1980 Guarnacci
4,222,680 A 9/1980 Browning
4,225,258 A 9/1980 Thompson
4,307,864 A 12/1981 Benoit
4,461,284 A 7/1984 Fackler
4,491,435 A 1/1985 Meier
4,585,197 A 4/1986 Liautaud et al.
4,611,839 A 9/1986 Rung et al.
4,620,813 A 11/1986 Lacher
4,641,986 A 2/1987 Tsui et al.
4,677,794 A 7/1987 Perron et al.
4,688,843 A 8/1987 Hall
4,796,508 A 1/1989 Hoshino
4,800,795 A 1/1989 Yamashita
4,805,784 A 2/1989 Solheim et al.
4,842,308 A 6/1989 Spotts
4,872,630 A 10/1989 Cooper
4,950,099 A 8/1990 Roellin
5,071,279 A 12/1991 Rustrom
5,092,551 A 3/1992 Meier
5,109,321 A 4/1992 Maglica et al.
5,118,058 A 6/1992 Richter
5,241,796 A 9/1993 Hellwig et al.
5,251,859 A 10/1993 Cyrell et al.
5,259,711 A 11/1993 Beck
5,270,911 A 12/1993 Maglica et al.
5,284,098 A 2/1994 Klapperich et al.
5,305,700 A 4/1994 Strong et al.
5,419,522 A 5/1995 Luecke et al.
5,441,225 A 8/1995 Hall
5,564,668 A 10/1996 Crowe, II
5,628,597 A 5/1997 Chudoba et al.
5,727,858 A 3/1998 Shapiro
5,823,724 A 10/1998 Lee
5,845,885 A 12/1998 Carnevali
6,173,926 B1 1/2001 Elvegaard
6,308,642 B1 10/2001 Branam et al.
6,561,476 B2 5/2003 Carnevali
6,581,892 B2 6/2003 Carnevali
6,588,722 B2 7/2003 Eguchi et al.
6,666,420 B1 12/2003 Carnevali
6,688,568 B1 2/2004 Moufflet
6,695,183 B2 * 2/2004 Hancock ................ B60R 11/00 211/64
6,789,988 B1 9/2004 Moradians
6,846,140 B2 1/2005 Anderson et al.
6,902,089 B2 * 6/2005 Carnevali ................ B60R 7/14 224/401
6,945,414 B1 9/2005 Stevens et al.
7,090,181 B2 8/2006 Biba et al.
7,100,808 B2 * 9/2006 Hancock .................. F16L 3/10 224/547
7,159,998 B2 1/2007 Moreland
D539,639 S 4/2007 Nagle
7,277,240 B2 10/2007 Carnevali
7,320,450 B2 1/2008 Carnevali
D563,781 S 3/2008 Carnevali
D564,062 S 3/2008 Carnevali
7,337,934 B2 * 3/2008 Alling ...................... F16B 2/10 224/401
7,401,995 B2 7/2008 Senakiewich, II
7,422,184 B2 9/2008 Carnevali
D588,903 S 3/2009 Carnevali
D589,327 S 3/2009 Carnevali
D590,696 S 4/2009 Carnevali
7,523,904 B2 4/2009 Carnevali
7,551,458 B2 6/2009 Carnevali
7,556,463 B1 7/2009 Hall
7,571,522 B2 8/2009 Carnevali
7,607,622 B2 10/2009 Carnevali
7,682,543 B2 3/2010 Carnevali
7,731,140 B2 6/2010 Carnevali
7,774,973 B2 8/2010 Carnevali
D629,080 S 12/2010 Dole et al.
7,849,630 B2 12/2010 Carnevali
7,850,133 B2 12/2010 Carnevali
7,854,204 B2 12/2010 Dacus
RE42,060 E 1/2011 Carnevali
7,887,018 B2 2/2011 Carnevali
7,950,701 B2 5/2011 Dole et al.
7,954,773 B2 6/2011 Carnevali
7,975,971 B2 7/2011 Carnevali
7,980,798 B1 7/2011 Kuehn et al.
RE42,581 E 8/2011 Carnevali
7,988,106 B2 8/2011 Carnevali
8,020,828 B2 9/2011 Carnevali
8,037,904 B2 10/2011 Carnevali
8,156,681 B2 4/2012 Carnevali
8,201,788 B2 6/2012 Carnevali
8,235,340 B2 8/2012 Carnevali
RE43,806 E 11/2012 Carnevali
8,322,955 B2 12/2012 Arnesen et al.
8,408,853 B2 4/2013 Womack et al.
8,454,178 B2 6/2013 Carnevali
8,505,861 B2 8/2013 Carnevali
8,534,519 B2 * 9/2013 Hancock .................. B60R 9/08 224/401
8,590,855 B2 11/2013 Carnevali
8,651,289 B2 * 2/2014 Diaz, Jr. ................ A01K 97/08 206/315.1
8,776,698 B2 7/2014 Pherson
8,992,238 B2 3/2015 Chinn
9,056,580 B2 6/2015 Baldsiefen et al.
9,180,925 B2 11/2015 Carnevali
9,253,970 B2 2/2016 Carnevali
9,365,150 B2 6/2016 Baldsiefen et al.
9,379,504 B2 6/2016 Chinn
9,623,787 B2 4/2017 Sterling
9,671,060 B1 6/2017 Cifers
9,828,073 B1 11/2017 Cifers, III
9,944,217 B2 4/2018 Schroeder et al.
9,975,466 B2 5/2018 Hendren et al.
9,987,993 B2 * 6/2018 Thorimbert ............... B60R 7/14
2003/0042282 A1 * 3/2003 Gates .................. A47B 81/005 224/560
2003/0185008 A1 10/2003 Moreland

(56) References Cited

U.S. PATENT DOCUMENTS

2004/0178309 A1 9/2004 Crowley et al.
2005/0036848 A1 2/2005 Cunningham et al.
2005/0092876 A1 5/2005 Carnevali
2005/0132937 A1 6/2005 Branam
2006/0000957 A1 1/2006 Carnevali
2006/0102823 A1 5/2006 Carnevali
2008/0115344 A1 5/2008 Carnevali
2008/0296334 A1 12/2008 Carnevali
2009/0014584 A1 1/2009 Ruddock et al.
2009/0095206 A1 4/2009 Dacus
2009/0108151 A1 4/2009 Carnevali
2009/0108152 A1 4/2009 Carnevali
2009/0140112 A1 6/2009 Carnevali
2009/0241293 A1 10/2009 Swerdlick
2010/0282802 A1 11/2010 Carnevali
2010/0284199 A1 11/2010 Carnevali
2010/0288843 A1 11/2010 Arnesen et al.
2011/0097177 A1 4/2011 Carnevali
2012/0006948 A1 1/2012 Hiss et al.
2012/0181409 A1 7/2012 Hayahara et al.
2012/0217353 A1 8/2012 Hennon
2012/0318937 A1* 12/2012 Carnevali ............ F16M 11/041 248/122.1
2013/0133158 A1 5/2013 Tran
2014/0003878 A1 1/2014 Knox et al.
2014/0034794 A1 2/2014 Carnevali
2014/0226315 A1 8/2014 Nicieja et al.
2014/0248103 A1 9/2014 Baldsiefen et al.
2015/0030386 A1* 1/2015 Carnevali ............... F16B 21/02 403/348
2015/0275942 A1* 10/2015 Carnevali ................. F16B 2/10 403/374.3
2016/0288691 A1 10/2016 Aubrey et al.
2017/0209318 A1 7/2017 Schroeder et al.

OTHER PUBLICATIONS

U.S. Appl. No. 15/612,798, filed Jun. 2, 2017.
U.S. Appl. No. 15/627,102, filed Jun. 19, 2017.
U.S. Appl. No. 15/650,726, filed Jul. 14, 2017.
Yakattack.us, 7 pages of product description of GearTrac retrieved from web site at: www.yakattack.us/by-product-name/geartrac/.
Yakattack.us, 4 pages of product description of GTTL retrieved from web site at: www.yakattack.us/geartrac/gttl/.
Yakattack.us, 6 pages of product description of GTSL90 retrieved from web site at: www.yakattack.us/by-product-name/geartrac/gtsl90/.
Yakattack.us, 5 pages of product description of GT90 retrieved from web site at: www.yakattack.us/geartrac/gt90/.
Yakattack.us, 4 pages of product description of GT175 retrieved from web site at: www.yakattack.us/geartrac/gt175/.

* cited by examiner

SYSTEMS AND METHODS FOR MAKING AND USING MOUNTS FOR RECEIVING OBJECTS AND COUPLING TO SURFACES

FIELD

The present invention is directed to mounts to receive objects and to couple to surfaces. The present invention is also directed to mounts configured and arranged to receive objects and couple to mounting tracks.

BACKGROUND

Providing mounts for holding, retaining, or securing objects has proven beneficial for many different uses. Some mountable-objects, such as electronic devices (e.g., phones, laptops, tablets, visual-enhancement devices, positioning devices, or the like), or manual-activity-based objects (e.g., cylindrical elements, oars, or the like) are increasingly used in situations where mounting the object to a surface increases the convenience of using the object. For example, mounts may eliminate the need to hold an object, or prop the device up, in order to use the object, thereby allowing a user to use the object more efficiently, or while simultaneously engaging in other activities which may benefit from the use of both hands without the encumberment of holding or propping-up the object. In some instances, mounting an object may increase user safety by enabling use of the object, without the distraction of holding the object.

Track systems enable an object to be held, retained, or secured, while also enabling limited movement of the object along a fixed path, or track. Attaching track systems to a surface provides a way to mount an object to the surface while also allowing flexibility of positioning of the object along portions of the surface along which the track system extends.

BRIEF SUMMARY

In one embodiment, a mount for receiving a cylindrical element includes a retention assembly coupled to a base and configured to retain the cylindrical element between the retention assembly and the base. The retention assembly includes arm segments extending from the base and at least two retaining members disposed at the distal end of at least one of the arm segments. The retaining members are separated from each other by a gap through which the cylindrical element is insertable. At least one of the arm segments or retaining members is resilient so that the gap is widened when that cylindrical element is pushed through the gap. The retaining members retain the cylindrical element between the retaining members and the base until force is applied to pull the cylindrical element back through the gap. A biasing member extends from, and is moveable relative to, the base to bias the cylindrical element against the retaining members while lacking sufficient force to push the cylindrical element through the gap.

In at least some embodiments, the arm segments are resilient and the retaining members are rigid. In at least some embodiments, the retaining members are resilient and the arm segments are rigid. In at least some embodiments, the retaining members are resilient and the arm segments are resilient.

In at least some embodiments, the retaining members are rotatable relative to the arm segments, the rotation of the retaining members facilitating insertion of the cylindrical element through the gap. In at least some embodiments, the retention assembly includes at least one multi-arm assembly, the at least one multi-arm assembly including at least two of the arm segments coupled together into one of a U-shape or a C-shape. In at least some embodiments, the arm segments are each individually coupled to the base. In at least some embodiments, the biasing member includes a movable element and a biasing element urging the movable element to move relative to the base. In at least some embodiments, the biasing element includes a coiled spring.

In another embodiment, a mount assembly includes the mount described above; and a retention element coupled to the base of the mount, the retention element configured to couple the mount to a mounting track.

In yet another embodiment, a mounting system includes the mount assembly described above, and a mounting track configured for attaching to a surface and to receive the retention element of the mount assembly.

In still yet another embodiment, a method for mounting a cylindrical element to a mount includes providing the mount described above; and inserting the cylindrical element through the gap between the retaining members of the mount and against the biasing member of the mount.

In another embodiment, an articulating mount assembly includes a base comprising a socket defining a first axis of rotation and a multi-axis coupling assembly coupled to the base. The multi-axis coupling assembly includes a spline insertable into the socket. A hub is coupled to the spline and configured to rotate about the base along the first axis of rotation. The hub is configured to rotatably couple with an articulating arm assembly so that the articulating arm assembly is rotatable relative to the hub along a second axis of rotation different from to the first axis of rotation. A slip disc washer is disposed between the spline and the hub. The slip disc washer is configured to control rotation of the hub about the first axis of rotation by increasing resistance to rotation while still permitting full rotation of the hub about the first axis of rotation.

In at least some embodiments, at least one retention element is configured to couple the base to a mounting track. In at least some embodiments, the base and socket are formed as a single-piece structure. In at least some embodiments, the second axis of rotation is orthogonal to the first axis of rotation.

In at least some embodiments, the articulating arm assembly is coupled to the hub along the second axis of rotation. The articulating arm assembly includes a first arm having a proximal end and an opposing distal end. The proximal end of the first arm is coupled to the hub and configured to rotate about the second axis of rotation. A second arm has a proximal end and an opposing distal end. The proximal end of the second arm is rotatably coupled to the distal end of the first arm along a third axis of rotation. The distal end of the second arm is configured to receive a mount.

In yet another embodiment, an articulating mount system includes the articulating mount assembly described above and a mount coupleable to the distal end of the second member of the articulating mount assembly. The mount is configured to to couple an object to the articulating mount assembly. In at least some embodiments, the mount is a ball mount.

In still yet other embodiments, a method of mounting an object to a mounting track includes providing the articulating mount system described above; coupling the base of the articulating mount system to a mounting track; and mounting the object to the mount disposed along the articulating mount assembly.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to mounts to receive objects and to couple to surfaces. The present invention is also directed to mounts configured and arranged to receive objects and couple to mounting tracks.

Mounts can be used for mounting objects to surfaces. In some instances, it may be advantageous to mount objects to surfaces by mounting the mounts to mounting tracks that, in turn, are attached to surfaces. Such an arrangement provides flexibility of location of the mounted object, as the mount is typically moveable, and retainable at multiple locations, along a fixed path defined by the mounting track.

A mounting track includes a continuous track formed along at least one track section along which a mount assembly, which includes a mount, can move. The continuous track retains the mount assembly to restrict movement of the mount to positions along the continuous track.

The mounting track can, optionally, be attached to a surface (e.g., a vehicle surface, a dock, a countertop, a railing, a gunwale, a cabinet, a table, a floor, a wall, a ceiling, a ledge, a handle, or the like). The mounting track can be configured to the size and shape of the surface to which the mounting track is attached. Examples of mounting tracks suitable for receiving mounts are found in, for example, U.S. patent application Ser. Nos. 15/612,764; 15/612,798; and Ser. No. 15/627,102, all of which are incorporated by reference.

Figure 1:
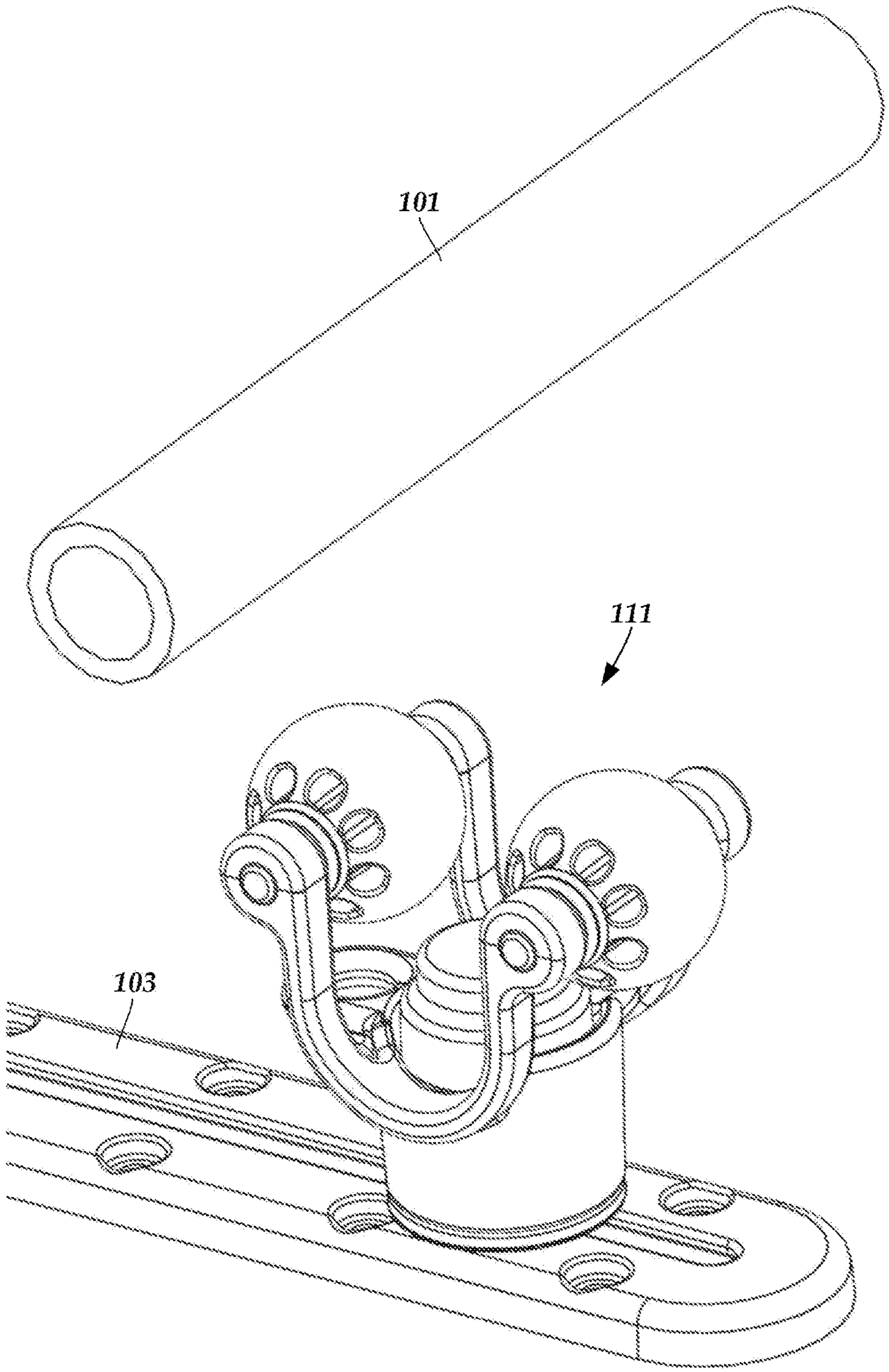
FIG. 1 is a schematic perspective view of one embodiment of a cylindrical element suitable for being received by a mount positioned along a mounting track, according to the invention.

Turning to FIGS. 1-5B, in some embodiments a mount is configured to receive a cylindrical element. FIG. 1 shows, in perspective view, one embodiment of a cylindrical element 101 suitable for being received by a mount 111 suitable for mounting to a surface. In the illustrated embodiment, the mount 111 is shown coupled to a mounting track 103 that is configured for attaching to a surface.

In some embodiments, the cylindrical element is entirely cylindrical (e.g., a tube, pipe, rod, or the like). In other embodiments, the cylindrical element is an elongated cylindrical portion of a larger object that includes one or more non-cylindrical portions. For example, the cylindrical element may be an oar, a fishing pole, or a handle of a tool, such as a hammer, shovel, screwdriver, or the like.

In some embodiments, the cylindrical element has a transverse profile that is circular, oblong, oval, capsule-shaped, or the like. In other embodiments, the cylindrical element has a transverse profile that is multi-sided. For example, the transverse profile of the cylindrical element may have three, four, five, six, seven, eight, nine, ten, eleven, twelve, or more sides.

Figure 2A:
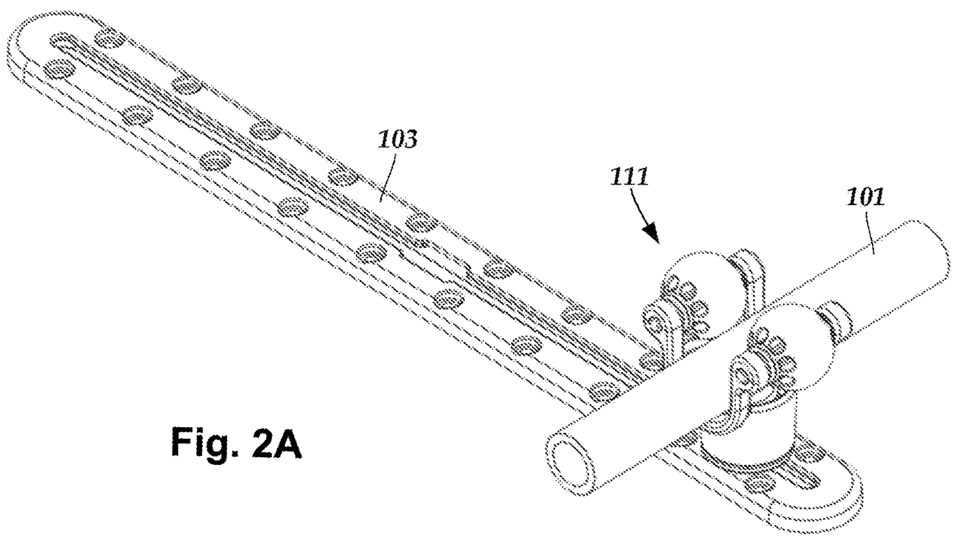
FIG. 2A is a schematic perspective view of one embodiment of the cylindrical element of FIG. 1 received by the mount of FIG. 1 and positioned along the mounting track of FIG. 1, according to the invention.
Figure 2B:
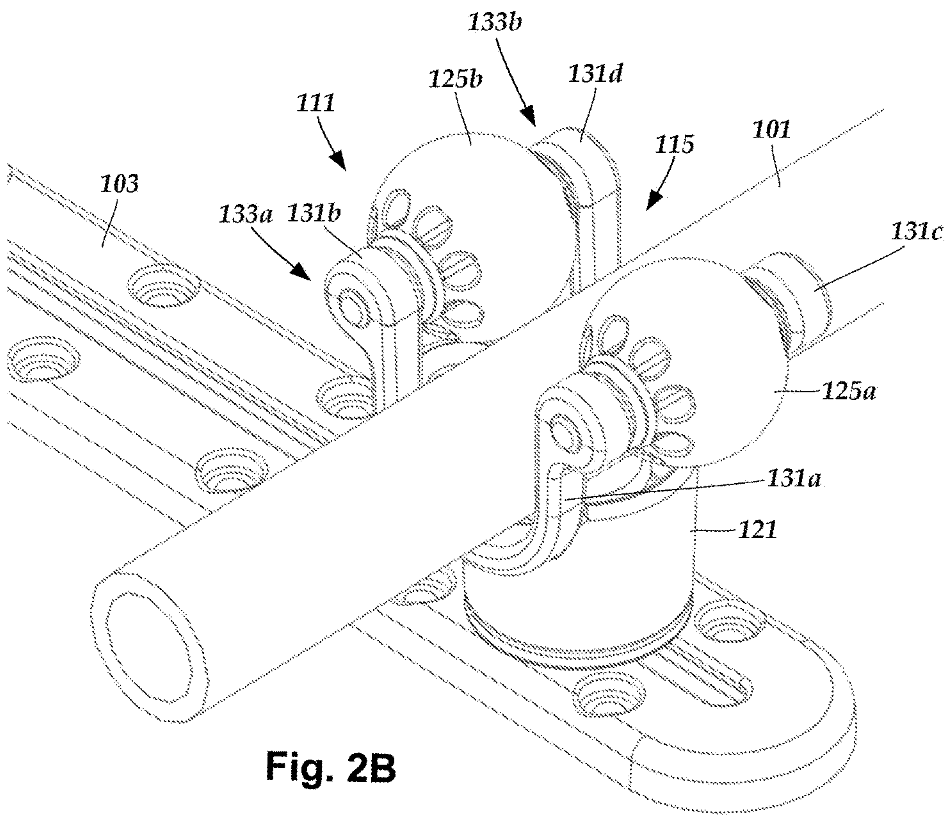
FIG. 2B is a schematic close-up perspective view of one embodiment of the cylindrical element of FIG. 2A received by the mount of FIG. 2A and positioned along the mounting track of FIG. 2A, according to the invention.

FIG. 2A shows, in perspective view, the cylindrical element 101 received by the mount 111 and positioned along the mounting track 103. FIG. 2B shows a close-up view of the mount 111 positioned along the mounting track 103. The mount 111 is coupled to the mounting track 103 via a retention element (not shown in FIGS. 2A-2B), which is discussed in more detail below, with reference to FIGS. 5A-5B.

The mount 111 includes a retention assembly 115 coupled to a base 121. The retention assembly 115 is configured to guide and receive the cylindrical element 101 using multiple retaining members 125*a*, 125*b* disposed along distal ends of multiple arm segments 131*a-d* extending from the base 121. The retaining members 125*a*, 125*b* are configured to guide the cylindrical element 101 through a gap between the retaining members and push the cylindrical element against a biasing member extending from, and moveable relative to, the base to bias the cylindrical element against the retaining members while lacking sufficient force to push the cylindrical element through the gap.

The mount 111 can include any suitable number of arm segments extending from the base including, for example, two, three, four, five, six, seven, eight, or more arm segments. In FIGS. 2A-2B (and in other figures) four arm segments are shown. In some embodiments, at least some of the arm segments are physically separated from each of the remaining arm segments. In other embodiments, and as shown in the illustrated embodiments, two or more arm segments are connected together into multi-arm assemblies, such as multi-arm assemblies 133*a*, 133*b*. In at least some embodiments, the multi-arm assemblies are U-shaped, or C-shaped. In at least some embodiments, each multi-arm assembly 133*a*, 133*b* couples to multiple retaining members.

The mount 111 can include any suitable number of retaining members including, for example, two, three, four, five, six, seven, eight, or more retaining members. In FIGS. 2A-2B (and in other figures) two retaining members 125*a*, 125*b* are shown. In the illustrated embodiment, the retaining members are spherical. Other shapes, both geometric and non-geometric, are possible including, for example, oval, capsule-shaped, cylindrical, or the like. In at least some embodiments, at least one retaining member is rotatable. It may be advantageous for at least one of the retaining members to be rotatable to facilitate guidance of a cylindrical element between the arm segments.

The retaining members can be coupled to any suitable number of arm segments including, for example, one, two, three, four, five, six, seven, eight, or more arm segments. In the illustrated embodiment, each retaining member is coupled to two arm segments.

Figure 3A:
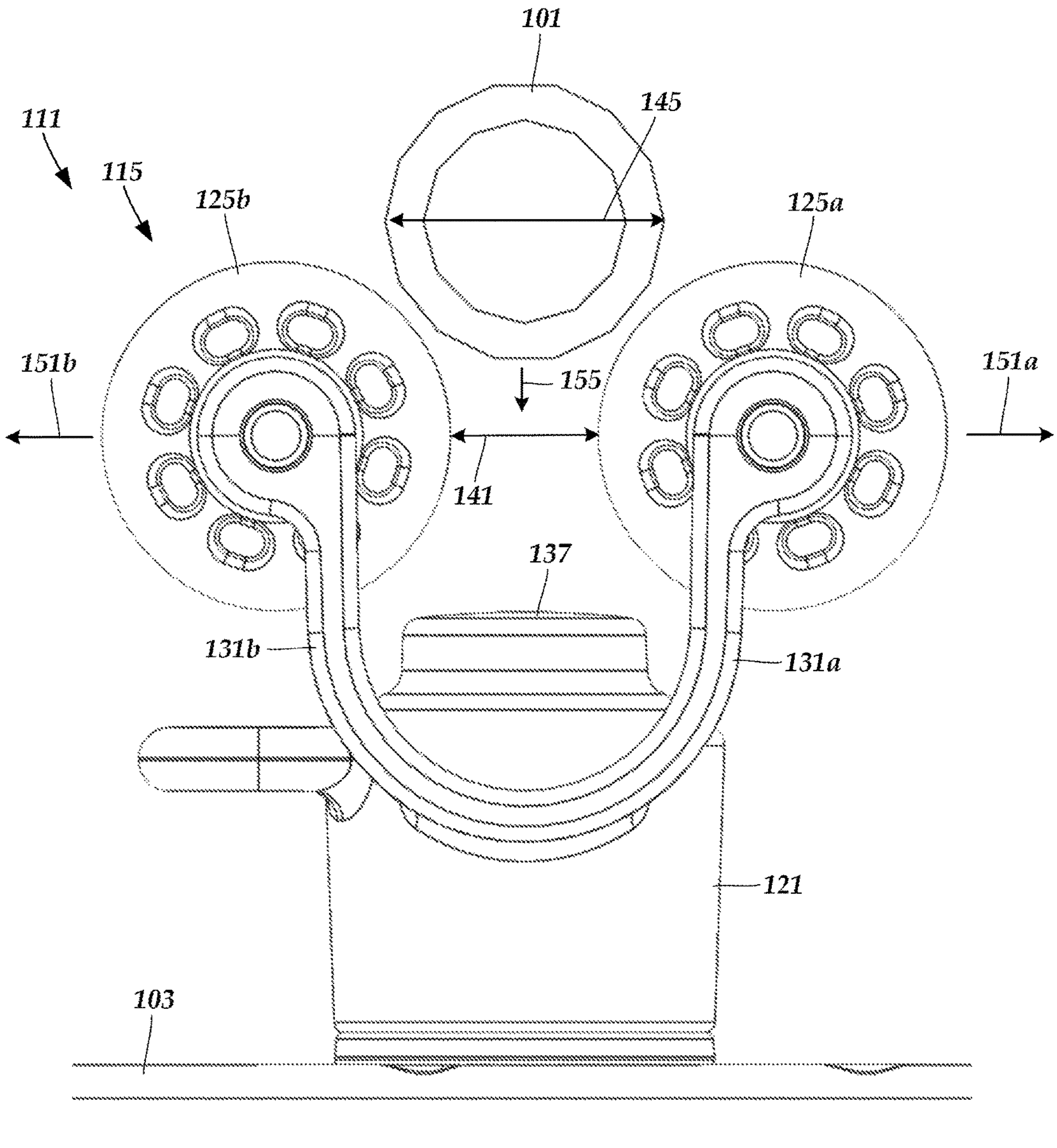
FIG. 3A is a schematic side view of one embodiment of the cylindrical element of FIG. 1 positioned over a pair of retaining members and arm segments of a retention assembly of the mount of FIG. 1, the retention assembly in a relaxed configuration with the pair of retaining members separated from each other by a gap through which the cylindrical element is insertable, according to the invention.

FIGS. 3A-3D show, in side view, one embodiment of the cylindrical element being received and retained by the mount 111. FIG. 3A shows the cylindrical element 101 positioned over the retention assembly 115 of the mount 111. The cylindrical element 101 is also disposed over a biasing member 137 disposed along the base 121.

As shown in FIG. 3A, the retaining members 125*a*, 125*b* of the retention assembly 115 are separated from one another by a gap having a first distance 141 when the retention assembly is in a relaxed configuration. As also shown in FIG. 3A, the cylindrical element includes at least one lateral dimension (shown in FIG. 3A as two-headed directional arrow 145) that is larger than the gap 141. Note that the lateral dimension is any dimension perpendicular to the long axis of the cylindrical element.

When the cylindrical element 101 passes between the guided elements 125*a*, 125*b*, the cylindrical element 101 extends the gap between the retaining members 125*a*, 125*b*, thereby exerting forces 151*a*, 151*b* that oppose the biasing of the retention assembly 115. When the cylindrical element 101 is moved in a direction 155 toward the biasing member 137, once the cylindrical element passes the beyond the gap 141 the retention assembly 115 pushes the cylindrical element against the biasing member 137.

Figure 3B:
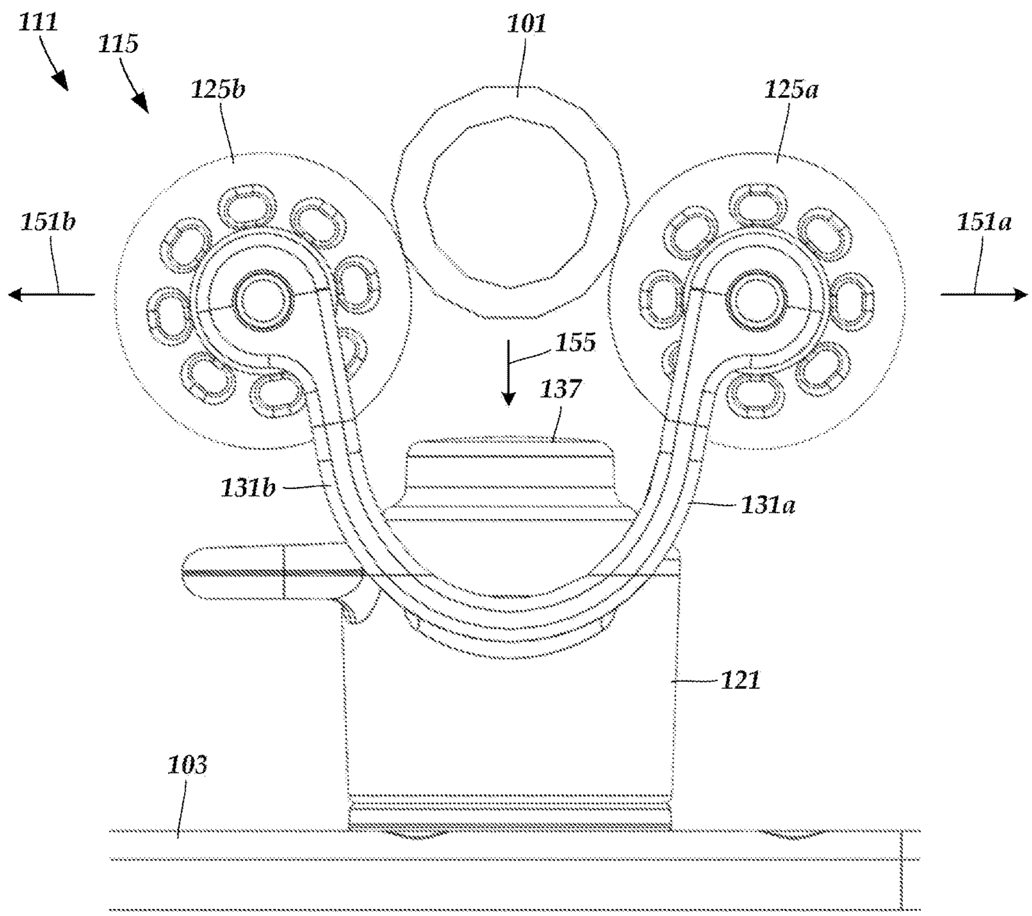
FIG. 3B is a schematic side view of one embodiment of the cylindrical element of FIG. 3A partially positioned between the pair of retaining members of FIG. 3A, the cylindrical element causing the gap between the retaining members to extend, according to the invention.
Figure 3C:
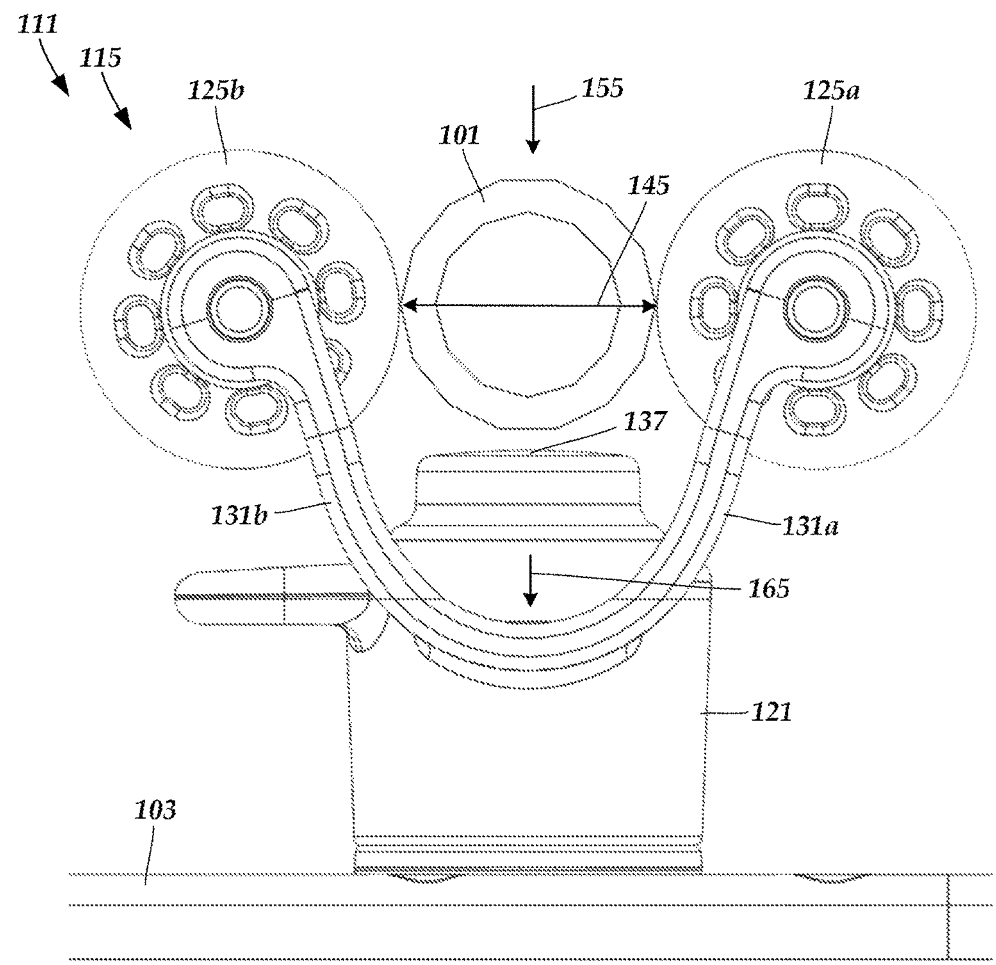
FIG. 3C is a schematic side view of one embodiment of the cylindrical element of FIG. 3A fully positioned between the pair of retaining members of FIG. 3A and over a biasing member, the gap between the pair of retaining members extended to accommodate an entire lateral dimension of the cylindrical element, according to the invention.

FIG. 3B shows the cylindrical element 101 partially positioned between the retaining members 125*a*, 125*b*. The cylindrical element 101 causes the gap 141 to extend and the retention assembly 115 transitions to a strained configuration. FIG. 3C shows the cylindrical element 101 fully positioned between the retaining members 125*a*, 125*b*. The gap 141 between the retaining members 125*a*, 125*b* is further extended to accommodate the entire lateral dimension 145 of the cylindrical element 101.

As the cylindrical element 101 continues in the direction 155 from the position shown in FIG. 3C, the retention assembly 115 begins to counteract the opposing forces 151*a*, 151*b* exerted by the cylindrical element 101. As a result, the retention assembly pushes the cylindrical element 101 against the biasing member 137, causing it to move downward, as shown by directional arrow 165. The biasing of the biasing member 137 counteracts the downward force applied by the biasing of the retention assembly 115 with an upward (with respect to the base) force sufficient to retain the cylindrical element 101 without pushing the cylindrical element back through the gap.

Figure 3D:
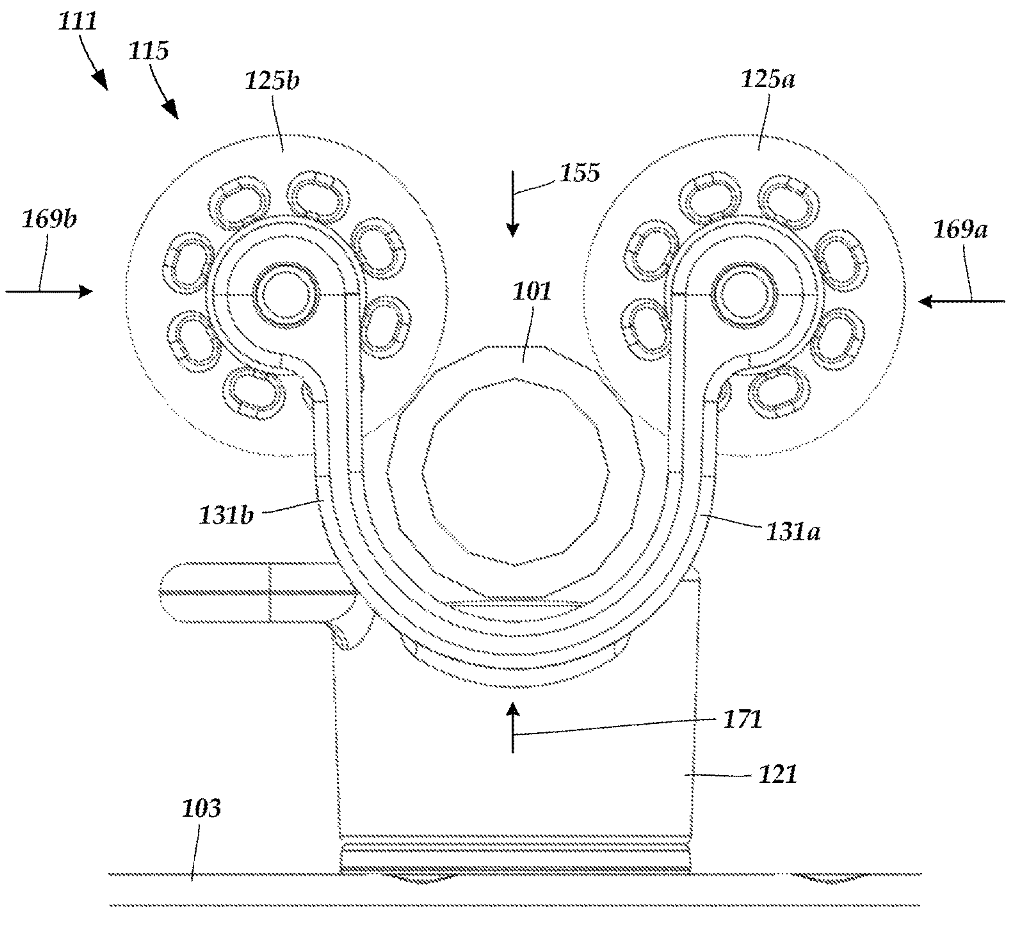
FIG. 3D is a schematic side view of one embodiment of the cylindrical element of FIG. 3A retained by the mount of FIG. 3A with the cylindrical element physically contacted by the retaining members of the mount of FIG. 3A and the biasing member, according to the invention.

FIG. 3D shows the cylindrical element 101 retained by the mount 111. The biasing of the retention assembly exerts inward forces 169*a*, 169*b* against the cylindrical element 101. The inward forces 169*a*, 169*b* also push the cylindrical element against the biasing member 137, as shown by directional arrow 155. At the same time, the bias of the biasing member 137 exerts a counteracting force, as shown by directional arrow 171, that pushes the cylindrical element 101 against the retaining member 125*a*, 125*b*. Collectively, the retention assembly and the biasing member retain the cylindrical element 101.

At least one of the arm segments or the two retaining members is resilient so that the gap is extended when that cylindrical element is pushed through the gap. The resiliency of the retention assembly can be generated by the arm segments, the retaining members, or a combination of both the arm segments and the retaining members. In at least some embodiments, at least one of the retaining members is resilient (e.g., compressible). In other embodiments, at least one of the retaining members is rigid. In at least some embodiments, at least one of the arm segments is resilient (e.g., flexible). In other embodiments, at least one of the arm segments is rigid.

The biasing of the biasing member can be generated in any suitable manner. In at least some embodiments, the biasing member is biased from at least one biasing element. The at least one biasing element can, for example, be implemented as at least one spring, such as at least one coiled spring. In at least some embodiments, the at least one biasing member extends from, and is moveable relative to, the base to bias the cylindrical element against the retaining members while lacking sufficient force to push the cylindrical element through the gap.

Figure 4:
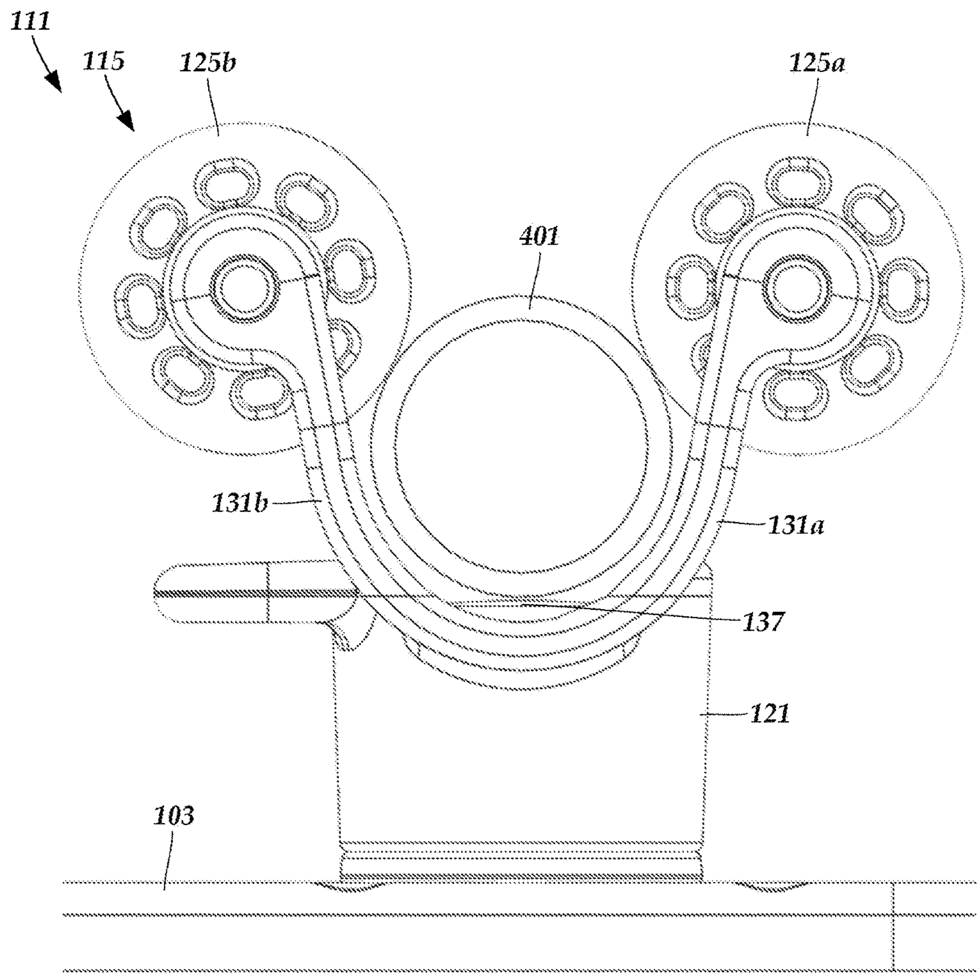
FIG. 4 is a schematic side view of another embodiment of a cylindrical element retained by the mount of FIG. 3A with the cylindrical element physically contacted by the pair of retaining members and the biasing member of the mount of FIG. 3A, according to the invention.

The mount can be used with cylindrical elements having different lateral dimensions and transverse shapes. FIG. 4 shows, in side view, of another embodiment of a cylindrical element 401 retained by the retention assembly 115 and the biasing member 137 of the mount 111. The cylindrical element 401 is physically contacted by the retaining members 125*a*, 125*b* and the biasing member 137. The cylindrical element 401 has a largest lateral dimension that is larger than the largest lateral dimension of the cylindrical element 101 of FIGS. 1-3D, yet the cylindrical element is still able to fit between the arm segments 131*a*, 131*b* and be retained by the mount 111. The cylindrical element 401 also has a different transverse cross-sectional shape than the cylindrical element 101. The cylindrical element 401 has a round transverse (lateral) shape, whereas the cylindrical element 101 has a dodecahedral transverse (lateral) shape.

Figure 5A:
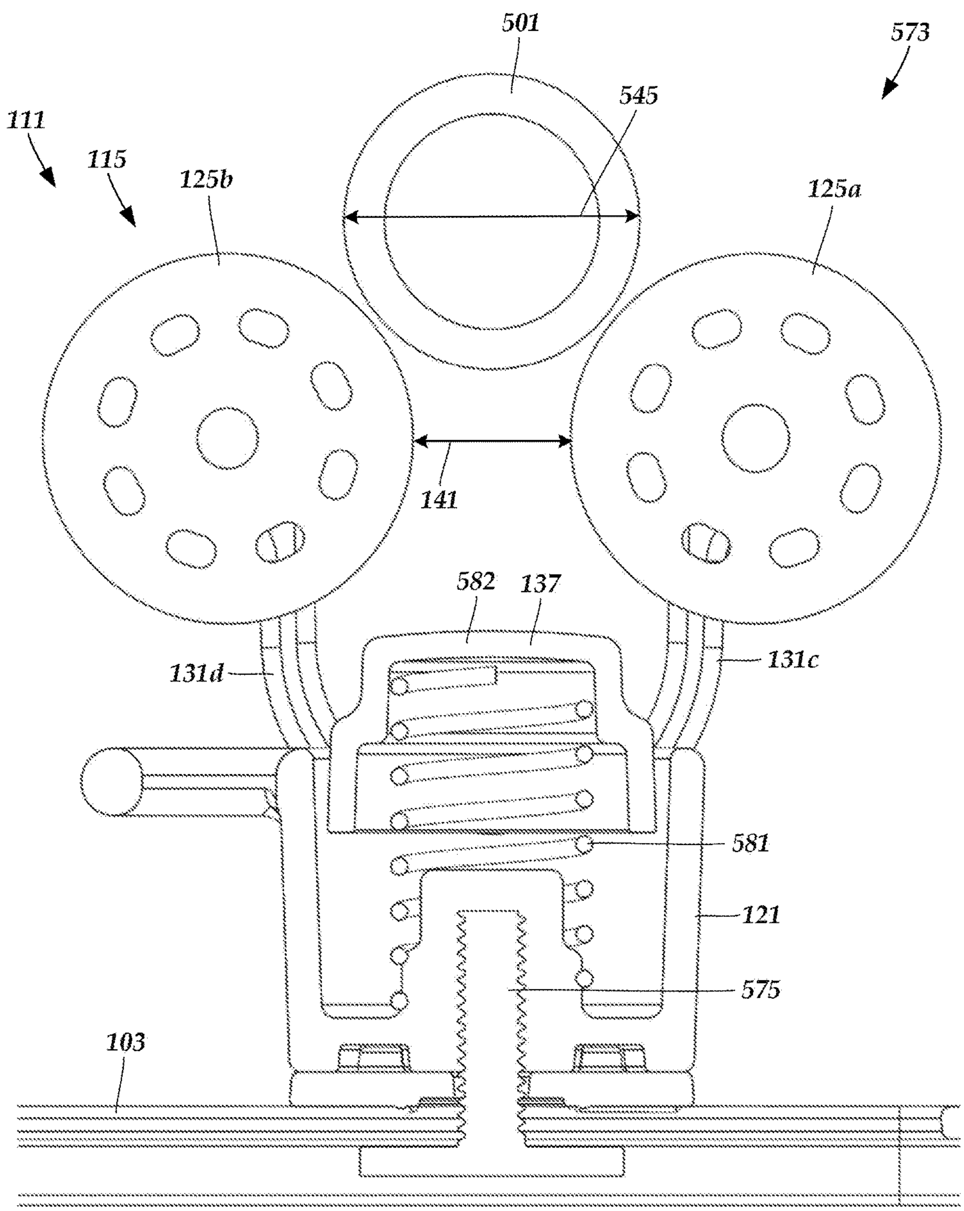
FIG. 5A is a schematic cross-sectional view of one embodiment of a cylindrical element positioned over the retention assembly and the biasing member of the mount of FIG. 1, the retention assembly and the biasing member each in a relaxed configuration, according to the invention.
Figure 5B:
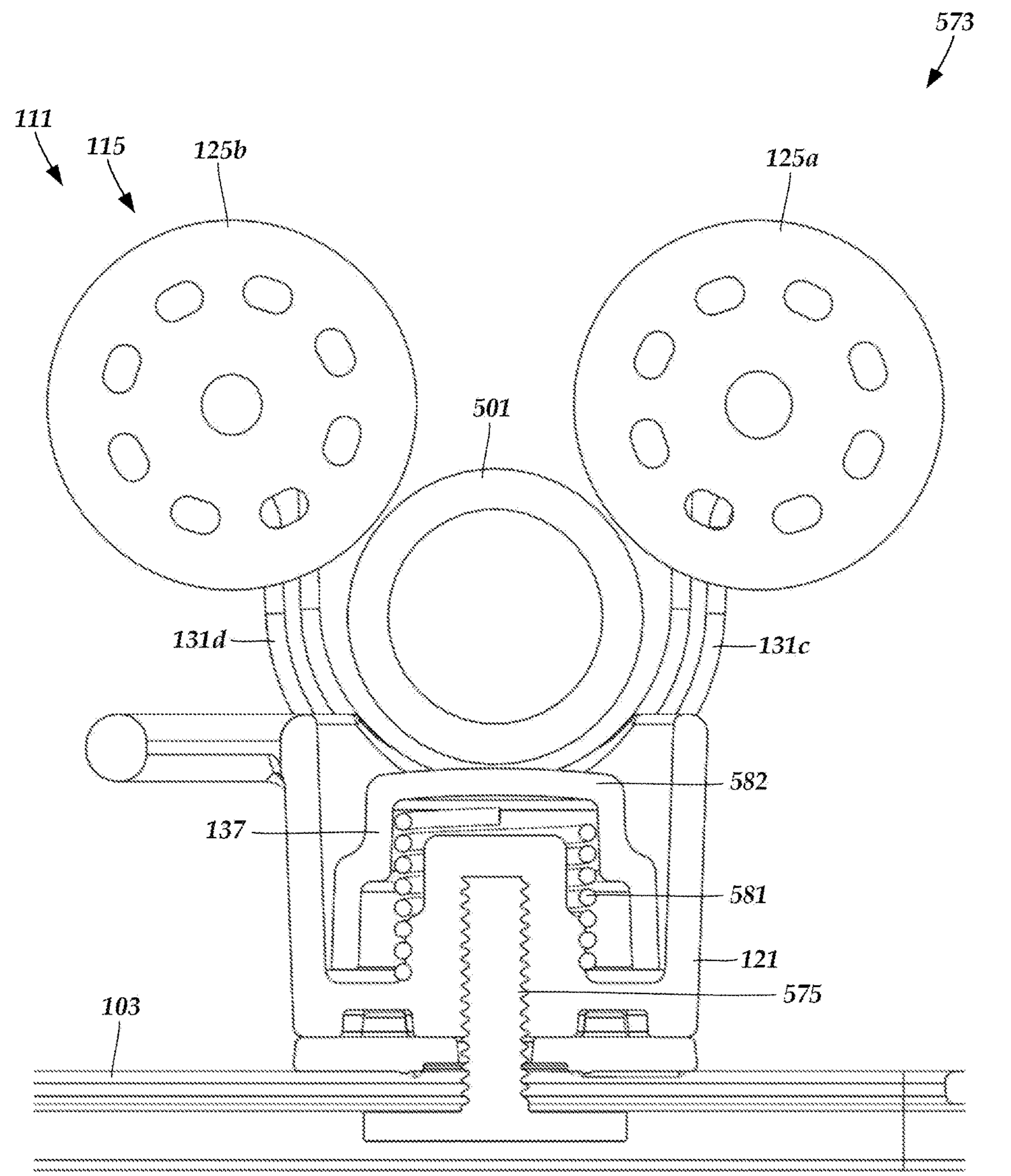
FIG. 5B is a schematic cross-sectional view of one embodiment of the cylindrical element of FIG. 5A positioned in the mount with the retention assembly and the biasing member of the mount of FIG. 5A each physically contacting the cylindrical element, the retention assembly and the biasing member each in a stressed configuration and exerting forces against each other to retain the cylindrical element, according to the invention.

FIG. 5A shows, in cross-sectional view, one embodiment of a cylindrical element 501 positioned over a mount assembly 573 coupled to the mounting track 103. The mount assembly 573 includes the mount 111 of FIGS. 1-4 and a retention element 575 coupleable to the mount 111. In FIGS. 5A-5B, the retention element 575 includes an elongated member attached to a flange. The elongated member is coupled to the mount 111, and the flange is coupled to the mounting track 103. The cylindrical element 401 is positioned over the retention assembly 115 of the mount 111.

The cylindrical element 501 is also disposed over the biasing member 137 and the base 121. As shown in FIG. 5A, the retention assembly 115 is in a relaxed configuration where the retaining members 125*a*, 125*b* are separated from each other by the gap 141. As also shown in FIG. 5A, the cylindrical element includes at least one lateral dimension 545 that is larger than the gap 141.

As shown in FIG. 5A, the biasing member 137 includes a biasing element, formed as a spring 581, coupled to a movable element 582 upon which a received object is positioned. The spring 581 is disposed in the base 121 and provides at least some of the biasing for the biasing member 137. In FIG. 5A, the spring 581 is in a relaxed configuration.

FIG. 5B shows, in cross-sectional view, one embodiment of the cylindrical element 501 positioned against the biasing member and retained by the mount 111. The spring 581 is in a stressed, or compressed, configuration that functions in combination with the resiliency of the retention assembly 115 to retain the cylindrical element 501.

Figure 6:
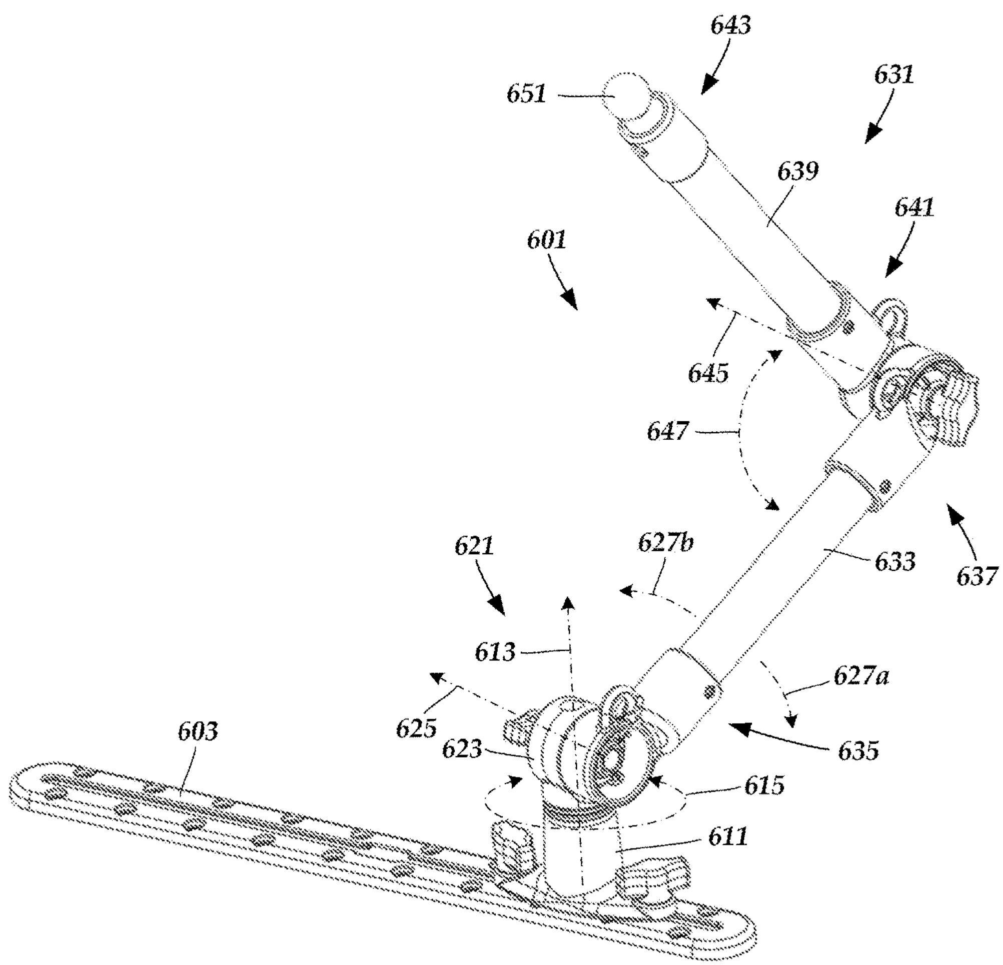
FIG. 6 is a schematic perspective view of one embodiment of an articulating mount assembly positioned along a mounting track, according to the invention.
Figure 7:
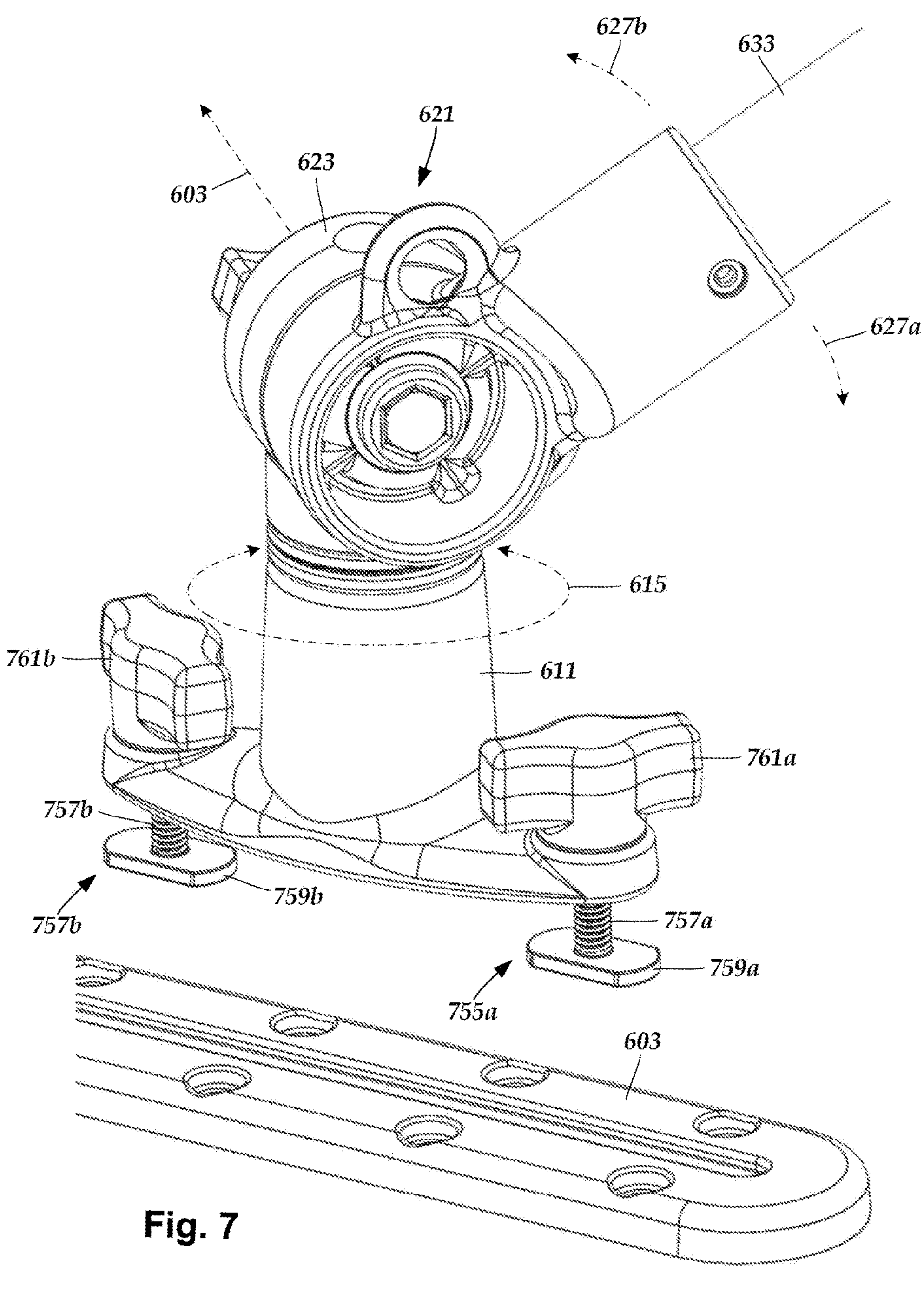
FIG. 7 is a schematic perspective view of one embodiment of a portion of the articulating mount assembly of FIG. 6 disposed over the mounting track of FIG. 6, according to the invention.
Figure 8:
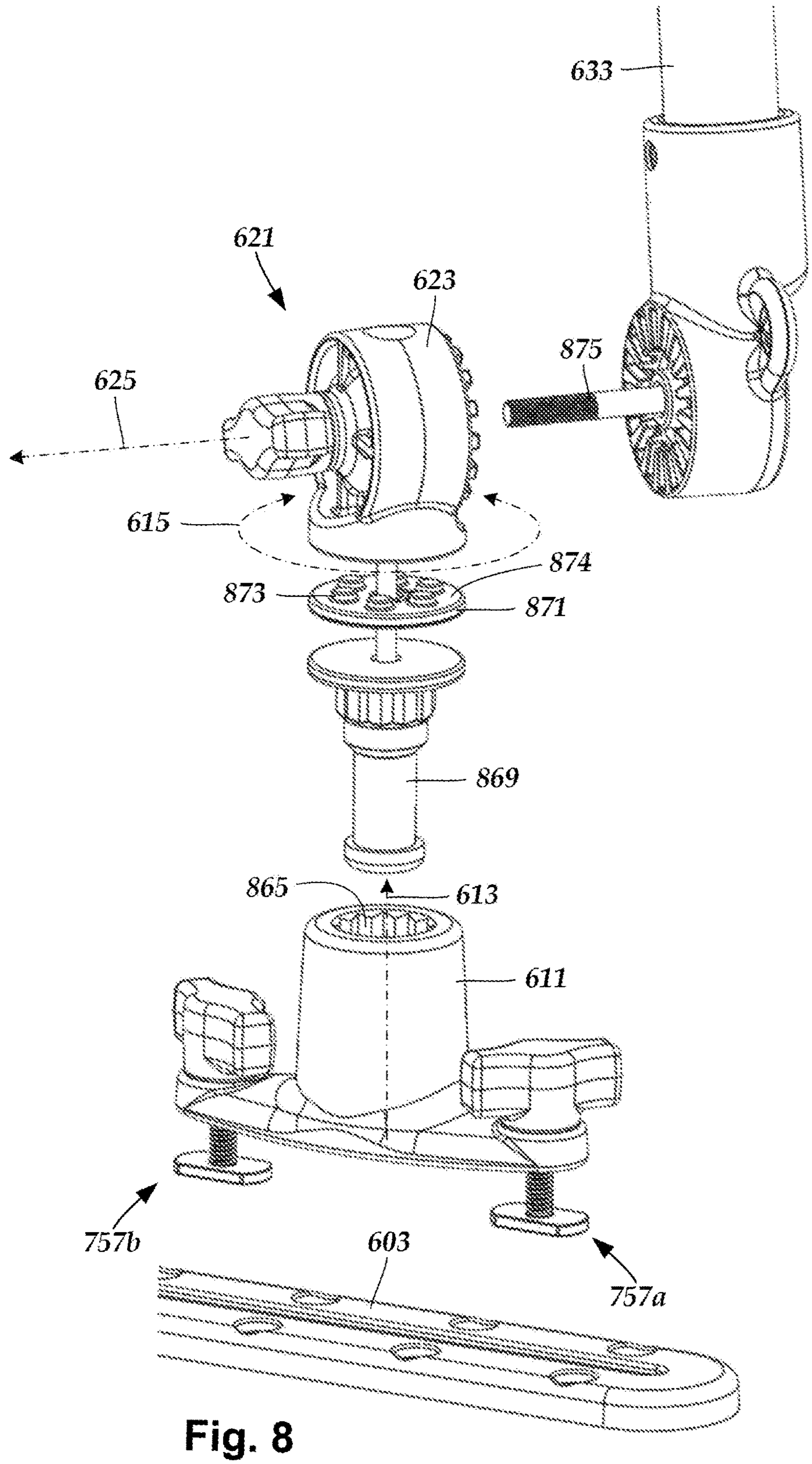
FIG. 8 is a schematic close-up perspective view of one embodiment of a portion of the articulating mount assembly of FIG. 6 disposed over the mounting track of FIG. 6, according to the invention.

Turning to FIGS. 6-8, in some embodiments an articulating mount assembly includes a mount positioned along an assembly that includes pivoting and rotating connections between two or more components. The articulating mount assembly may enable increased flexibility to move the mount to a mounting location than if the mount were attached along a non-articulating, or fixed, mount assembly. Such flexibility may be increased still more by coupling the articulating mount assembly to a mounting track. A ball mount is used as the exemplary mount positioned along the articulating mount assembly in the below description, for clarity of illustration. It will be understood, however, that any suitable mount may be disposed along the articulating mount assembly instead of a ball mount.

FIG. 6 shows, in perspective view, one embodiment of an articulating mount assembly 601. The articulating mount assembly 601 includes a base 611, a rotatable multi-axis coupling assembly 621 coupled to the base, and an articulating arm assembly 631 coupled to the multi-axis coupling assembly. A mount 651 is coupled, or coupleable, to the articulating arm assembly.

The base 611 is configured to couple the articulating mount assembly 601 to a surface. In at least some embodiments, the articulating mount assembly 601 is coupled to a mounting track, such as the mounting track 603. The mounting track can, optionally, be attached to a surface (e.g., a vehicle surface, a dock, a countertop, a railing, a gunwale, a cabinet, a table, a floor, a wall, a ceiling, a ledge, or the like). The mounting track can be configured to the size and shape of the surface to which the mounting track is attached. The mounting track can be used to retain any suitable number of mount assemblies (e.g., one, two three, four, five, six, seven, eight, nine, ten, twenty, or more mount assemblies). When the articulating mount assembly 601 is mounted to a mounting track, the articulating mount assembly 601 is movable along a fixed path formed by the track, thereby further increasing the number of mounting locations reachable by the mount 651 compared to when the articulating mount assembly is attached to a surface at a fixed location.

The base 611 defines a first axis of rotation 613. The multi-axis coupling assembly 621 includes a hub 623 that is coupled to the base 611 and rotatable about the first axis of rotation 613, as indicated by directional arrow 615. The hub 623 also rotatably couples to the articulating arm assembly 631 about a second axis of rotation 625 that is different than the first axis of rotation 613. In at least some embodiments, the second axis of rotation 625 is orthogonal to the first axis of rotation 613. The articulating arm assembly 631 is configured to pivot about the second axis of rotation 625, as shown by directional arrows 627*a*, 627*b*.

The articulating arm assembly 631 includes a first arm 633 having a proximal end 635 and an opposing distal end 637. In at least some embodiments, the proximal end 635 of the first arm 633 is pivotably coupled to the hub 623. The articulating arm assembly 631 further includes a second arm 639 having a proximal end 641 and an opposing distal end 643. The proximal end 641 is pivotably coupled to the distal end 637 of the first arm 633 along a third axis of rotation 645. The directions of the pivoting between the first arm 633 and the second arm 639 is shown by directional arrow 647. The mount 651 is coupled, or coupleable, to the second arm 639. In at least some embodiments, the mount 651 is coupled, or coupleable, to the distal end 643 of the second arm 639.

As mentioned above, the mount 651 can be any suitable type of mount including, for example, a ball mount, an electronic device mount (e.g., a camera mount, a smartphone mount, a tablet mount, a positioning device mount, a music player mount, or the like) a cleat, a drink holder, or the like or combinations thereof. The choice of different mounts may, in some instances, be determined based, at least in part, on the particular functionality desired. In at least some embodiments, mounts can be removed from the articulating mount assembly and swapped out for other mounts, as desired.

In at least some embodiments, the articulating mount assembly includes at least one retention element configured to facilitate coupling of the articulating mount assembly to a mounting track. FIG. 7 shows, in perspective view, one embodiment of the articulating mount assembly 601 disposed over the mounting track 603. In the illustrated embodiment, the articulating mount assembly 601 includes two retention elements 755*a*, 755*b* extending from the base 611. The articulating mount assembly 601 can include any suitable number of retention elements including, for example, one, two, three, four, or more retention elements.

The retention elements 755*a*, 755*b* are configured for being received by the mounting track 603. In at least some embodiments, the retention elements 755*a*, 755*b* include elongated members 757*a*, 757*b*, respectively, that couple to the base 611 and flanges 759*a*, 759*b*, respectively, that are configured for being retained along the mounting track 603. In at least some embodiments, tighteners 761*a*, 761*b* disposed along the base 611 are used to facilitate tightening the retention elements 755*a*, 755*b*, respectively, against the mounting track 603, thereby enabling the articulating mount assembly 601 to be locked by a user at a desired location along the mounting track 603.

FIG. 8 shows, in exploded perspective view, one embodiment of the articulating mount assembly 601 disposed over the mounting track 603. The base 611 includes a socket 865 defining along the first axis of rotation 613. In at least some embodiments, the base 611, with the socket 865 positioned within the base, is formed as a single-piece structure to simplify use. The multi-axis coupling assembly 621 includes a spline 869 extending from the hub 623 and inserted into the socket 865 during use of the articulating mount assembly 601.

In at least some embodiments, a slip disc washer 871 is disposed between the spline 869 and the hub 623. The slip disc washer 871 is configured and arranged to control rotation of the hub 623 about the first axis of rotation 613, as indicated by directional arrow 615. In at least some embodiments, the slip disc washer 871 provides increased resistance to rotation of the hub 623 about the first axis of rotation 613 relative to rotation of the hub 623 about the first axis of rotation 613 without the slip disc washer 871. In FIG. 8, the slip disc washing includes nubs, such as nub 873 disposed along a major surface 874 of the slip disc washer 871. The sizes and shapes of the nubs 873 function to adjust the amount of resistance to rotation of the hub 623 about the first axis or rotation 613. In other embodiments, other surface features, such as surface abrasions, dimples, and other features are used in lieu of (or in addition to) nubs to provide resistance to rotation. In at least some embodiments, the nubs 873 provide a ratcheting rotational movement of the hub 623 about the first axis or rotation 613.

In at least some embodiments, first arm 633 pivotably couples to the hub 623, at least in part, via a shaft 675 that defines the second axis of rotation 625. In FIG. 8, the shaft 675 extends from the first arm 633 and is configured for being received by a corresponding aperture (not shown) defined in the hub 623. In other embodiments, the shaft extends from the hub and is received by a corresponding aperture defined in the first arm 633. In at least some embodiments, another matable shaft and aperture are used to form the pivotable coupling between the first arm 633 and the second arm 639 along the third axis or rotation 645.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A mount for receiving a cylindrical element, the mount comprising:

a base;

a retention assembly coupled to the base and configured and arranged to retain the cylindrical element between the retention assembly and the base, the retention assembly comprising a plurality of arm segments, each arm segment extending from the base, and at least two retaining members, each retaining member disposed at the distal end of at least one of the plurality of arm segments, wherein the retaining members are separated from each other by a gap through which the cylindrical element is insertable, wherein at least one of the arm segments or retaining members is resilient so that the gap is widened when that cylindrical element is pushed through the gap, wherein the retaining members retain the cylindrical element between the retaining members and the base until force is applied to pull the cylindrical element back through the gap; and a biasing member extending from, and moveable relative to, the base to engage the cylindrical element and bias the cylindrical element against the retaining members while lacking sufficient force to push the cylindrical element through the gap, wherein the biasing member comprises a movable element and at least one biasing element urging the movable element to move relative to the base.

2. The mount of claim 1, wherein the arm segments are resilient and the retaining members are rigid.

3. The mount of claim 1, wherein the retaining members are resilient and the arm segments are rigid.

4. The mount of claim 1, wherein the retaining members are resilient and the arm segments are resilient.

5. The mount of claim 1, wherein the retaining members are rotatable relative to the arm segments, the rotation of the retaining members facilitating insertion of the cylindrical element through the gap.

6. The mount of claim 1, wherein the retention assembly comprises at least one multi-arm assembly, the at least one multi-arm assembly comprising at least two of the arm segments coupled together into one of a U-shape or a C-shape.

7. The mount of claim 1, wherein the arm segments are each individually coupled to the base.

8. The mount of claim 1, wherein the at least one biasing element comprises a coiled spring.

9. A mount assembly, comprising:

the mount of claim 1; and a retention element coupled to the base of the mount, the retention element configured and arranged to couple the mount to a mounting track.

10. A mounting system, comprising:

the mount assembly of claim 9, and a mounting track configured and arranged for attaching to a surface and to receive the retention element of the mount assembly.

11. A method for mounting a cylindrical element to a mount, the method comprising:

providing the mount of claim 1; and inserting the cylindrical element through the gap between the retaining members of the mount and against the biasing member of the mount.

12. The mount of claim 5, wherein each of the retaining members is configured to rotate 360 degrees about an axis.

13. The mount of claim 1, wherein at least one the biasing element is configured to push the movable element to extend out of the base.

14. The mount of claim 13, wherein the movable element is configured to at least partially retract into the base upon application of a force countering the at least one biasing element.

15. The mount of claim 1, wherein the retaining members extend distally beyond the arm segments.

16. The mount of claim 1, wherein the movable element of the biasing member is unattached to the base so that the movable element is freely movable relative to the base.

17. The mount of claim 1, wherein the retaining elements are spherical.

18. The mount of claim 1, wherein the retaining elements are cylindrical.

19. The mount of claim 1, wherein the retaining elements are configured to engage the cylindrical element and push the cylindrical element against the movable element of the biasing member.

20. The mount of claim 8, wherein the coiled spring is configured to be compressed when the cylindrical element is retained between the retention assembly and the base.

* * * * *